UNITED STATES PATENT OFFICE.

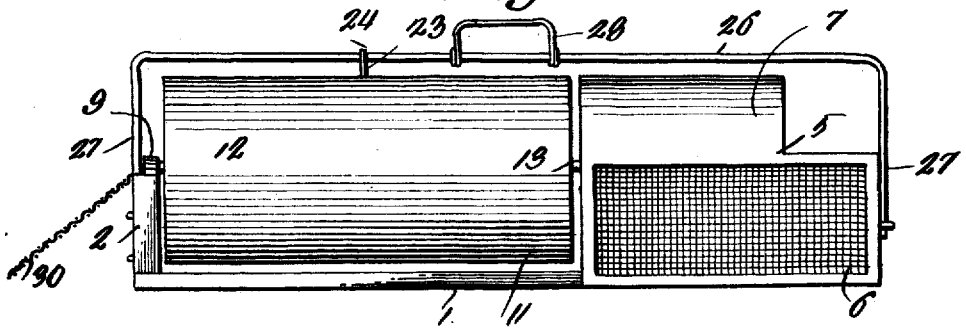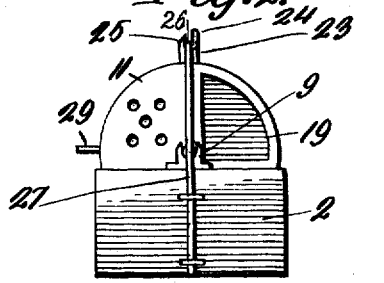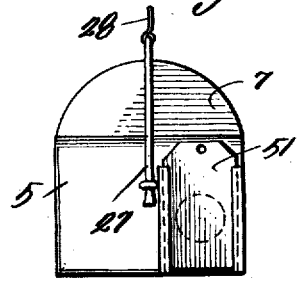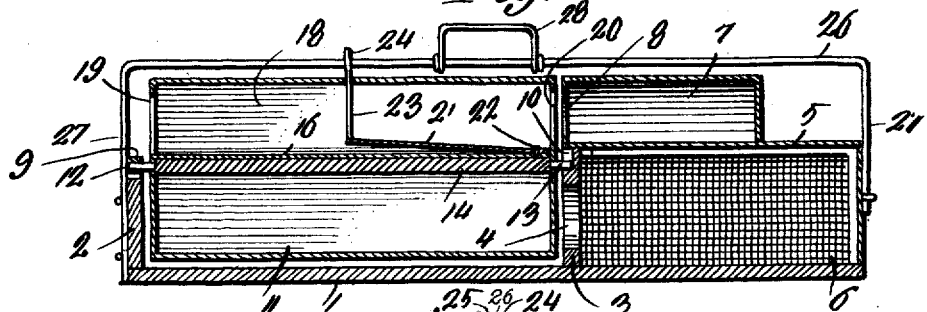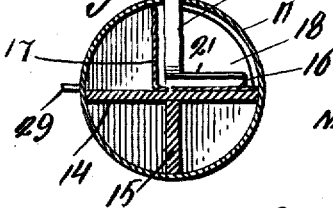

NEWTON P. CAPEHART, OF CRYSTAL RIVER, FLORIDA.

TRAP.

1,340,372.    Specification of Letters Patent.    Patented May 18, 1920.

Application filed October 25, 1919. Serial No. 333,277.

*To all whom it may concern:*

Be it known that I, NEWTON P. CAPE-HART, a citizen of the United States, residing at Crystal River, in the county of Citrus and State of Florida, have invented certain new and useful Improvements in Traps, of which the following is a specification.

My invention relates to new and useful improvements in traps and more particularly to a rat trap although by making the same of proper size it could equally as well be used for catching rabbits, minks, etc.

My invention has for its principal object the provision of a trap of the self-set and ever-set type.

Another object of the invention resides in the provision of a trip which is operated by the animal so as to release the rotatable drum so that the animal may pass therefrom into a compartment for confinement.

A further object resides in the provision of means for returning the rotatable cylinder to its proper position for allowing the trapping of further animals and the provisions of a bait compartment which cannot be reached by the animal.

A still further object consists in the provision of a novel form of handle by which the trap may be moved from place to place and said handle coöperating with the trip mechanism for holding the rotatable cylinder in proper position.

With these and other objects in view my invention consists of the novel details of construction and arrangement of parts which will be more clearly understood from the following specification and drawings in which:—

Figure 1 is a side elevation.

Fig. 2 is an end elevation of one end of the trap.

Fig. 3 is an end elevation of the opposite end of the trap.

Fig. 4 is a longitudinal vertical section and,

Fig. 5 is a transverse vertical section through the rotatable cylinder.

In the drawings the numeral 1 indicates the base of the trap and 2 a plate or standard secured to one end of the base. A plate 3 is secured to the base 1, intermediate the ends thereof, and is provided with an opening 4 therein for a purpose to be later described. A housing 5 is secured to the base 1, between one end and the plate 3, and in fact overlies the top of the plate 3 as illustrated more particularly in Fig. 4 of the drawings. The housing 5 is divided into two compartments the same being designated at 6 and 7. The compartment 6 has wire mesh secured in the sides thereof as is clearly illustrated in Figs. 1 and 4 of the drawings. The compartment 7 has an opening 8 formed in the forward end thereof for a purpose to be later described.

A bearing plate 9 is secured to the top edge of the plate 2 and the plate 3 is cut away as indicated at 10 to form a bearing. A cylinder 11 is rotatably mounted between the plates 2 and 3 and is provided on the forward end with a spindle or axle 12 adapted to rest in the bearing plate 9. A spindle or axle 13 is secured to the opposite end of the cylinder to be received in the recess 10 of the plate 3. As more particularly illustrated in the drawings the cylinder is slightly spaced from the bottom plate 1 so that it will freely rotate.

A longitudinally extending plate or partition 14 is secured in the cylinder and a vertical longitudinally extending partition 15 is secured between the underside of the partition 14 and the cylinder. A plate 16 is secured to the top of the plate or partition 14 and the inner edge is bent upwardly as indicated at 17 to form a vertical longitudinally extending partition. From the construction described for the cylinder it will be noted that the same is divided into four separate compartments. One of the compartments which I will designate 18 is provided at the front end with an opening 19 and at the rear end with an opening 20.

A spring plate 21 is secured in the compartment 18 by means of the rivets 22 or other suitable fastening means. A vertically extending plate 23 is secured to the outer end of the spring plate 21 and the upper end of this plate 23 is bifurcated to form the arms 24 and 25 as more particularly illustrated in Fig 5 of the drawings. As illustrated the arm 24 is of greater height than the arm 25 and the purpose of this will be later described. As is more clearly illustrated in Fig. 4 of the drawings the forward end of the spring plate 21 extends above the plate 16 and the vertical plate 23 is adapted to pass through an opening formed in the top of the cylinder 11.

A bail or handle 26 is secured to the trap by means of the depending arms 27. These arms are adapted to be secured to the front and rear end of the trap as shown and a hand-hold 28 is secured to the top of the bail or handle intermediate the ends thereof. The bifurcated end of the vertical plate 23 is adapted to engage the handle 26 as is more particularly illustrated in Fig. 2 of the drawings. A pin 29 is secured to one side of the cylinder 11 and is of such a length that it will engage the handle 26 when the cylinder is rotated the required distance. A run-way 30 is secured to the top of the plate 2 adjacent the opening 19 in the compartment 18.

The compartment 6 is provided at the rear end with an opening which is adapted to be closed by means of a vertically slidable door 31. This door is more particularly illustrated in Fig. 3 of the drawings.

Having fully described the detailed construction of my trap it is thought that the manner of operating will be clearly understood. When set for the reception of the animal the parts will be in the position illustrated in the drawings. The bait will be placed in the compartment 7 of the housing 5. The animal will pass up the passage-way 30 and into the opening 19 of the section 18 of the cylinder. The animal will continue through the cylinder until he engages the spring plate 21 and his weight thereon will lower the forward end of the plate and the plate 23 will be drawn downwardly to disengage the bifurcated end from the handle 26. This will release the cylinder and allow the same to rotate until the pin 29 engages the handle 25. The animal will then pass out through the opening 20, through the opening 4 in the plate 3, into the compartment 6 of the housing. When the animal has left the cylinder the weight of the partition 15 will return the cylinder to its normal position. The handle 26 will engage the shorter arm 25 of the plate 23 and lower the spring plates 21 but the longer arm 24 will prevent the cylinder from rotating too far. The animal which has been trapped in the compartment 6 may be removed by opening the door 31.

By grasping the hand-hold 28 on the handle 26 the trap may be lifted and moved from place to place.

The foregoing description and the drawings have reference to what may be considered the preferred, or approved form of my invention. It is to be understood that I may make such changes in construction and arrangement and combination of parts, materials, dimensions, etc. as may prove expedient and fall within the scope of the appended claims.

Having fully described my invention what I claim as new and desire to secure for Letters Patent is:—

1. A trap comprising a base, a compartment secured to the base, a cylinder rotatably mounted on the base, a handle secured to the base, and a trip secured to the cylinder and adapted to normally engage the handle.

2. A trap comprising a base, a compartment secured to the base, a cylinder rotatably mounted on the base, a handle secured to the base, a spring plate secured in the cylinder, a vertical plate secured to the spring plate and extending through the cylinder and adapted to normally engage the handle, and means for limiting the movement of the cylinder when the plate is disengaged from the handle.

3. A trap comprising a base, a compartment secured to the base, a cylinder rotatably mounted on the base, a handle secured to the base and overlying the cylinder, a spring plate secured in the cylinder, a second plate secured to the spring plate and extending through an opening in the cylinder and engaging the handle, and a passage-way secured to the base and leading into one end of the cylinder.

4. A trap comprising a base, a compartment secured to one end of the base, a cylinder rotatably mounted on the opposite end of the base, a handle secured to the base and overlying the cylinder, a spring plate secured in the cylinder, and a plate secured to the end of the spring plate and extending through the cylinder, the end of said last named plate being bifurcated to form arms adapted to engage the handle.

In testimony whereof I affix my signature in presence of two witnesses.

NEWTON P. CAPEHART.

Witnesses:
W. E. HOUGH,
H. V. COOKSEY.